UNITED STATES PATENT OFFICE.

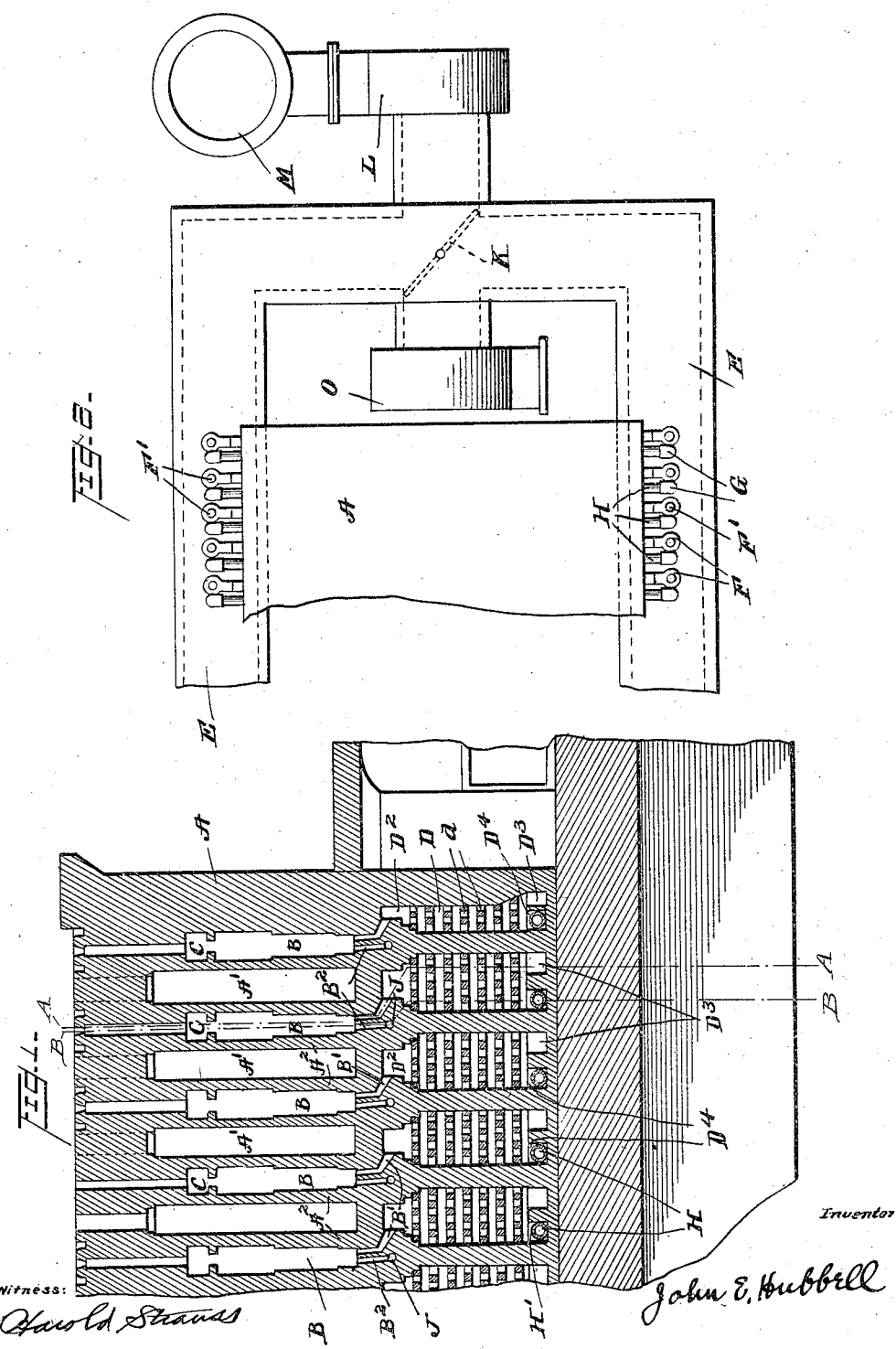

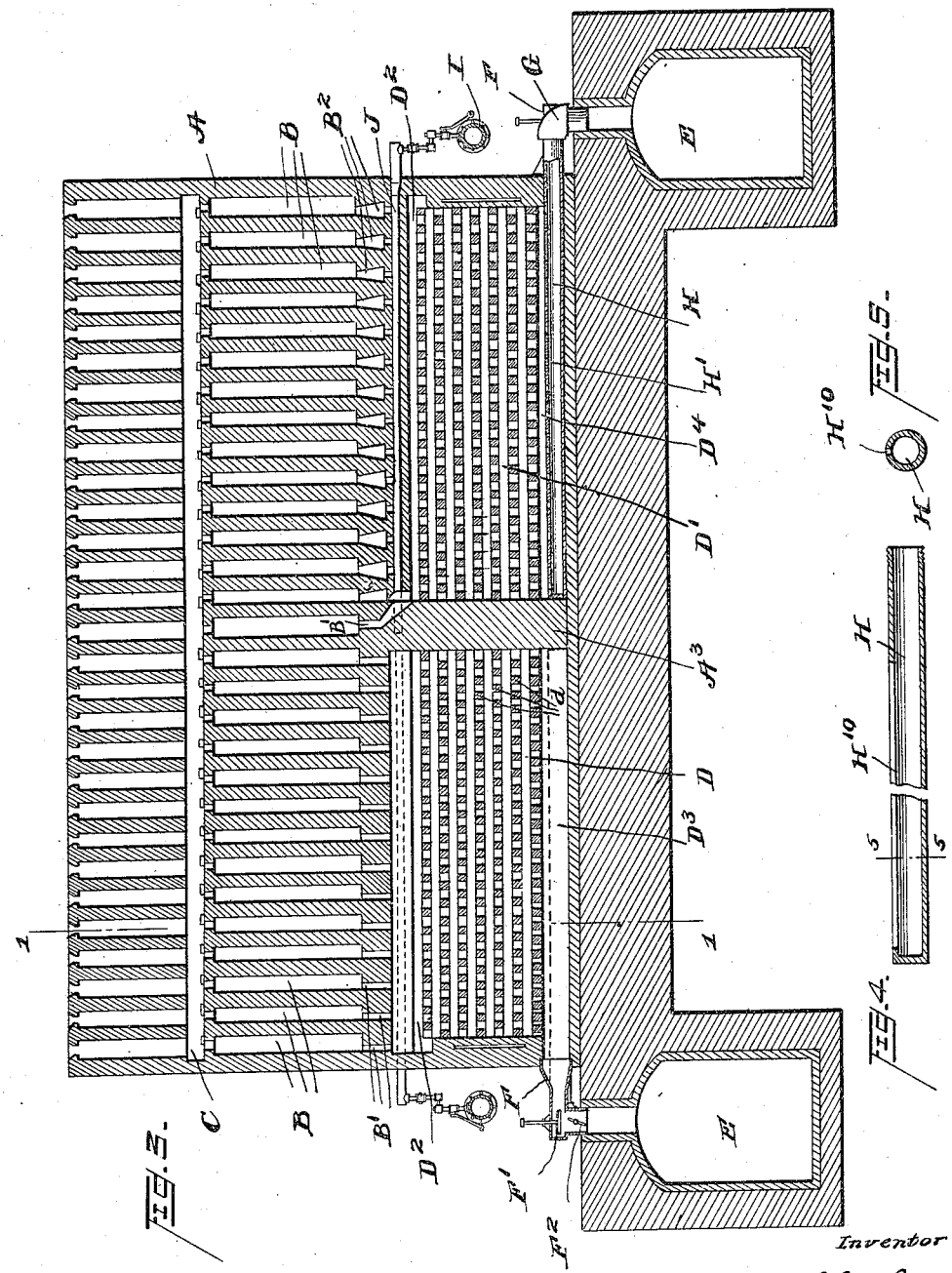

JOHN E. HUBBELL, OF PHILADELPHIA, PENNSYLVANIA, ASSIGNOR TO LOUIS WILPUTTE, OF NEW ROCHELLE, NEW YORK.

COKE-OVEN.

1,254,007.  Specification of Letters Patent.  Patented Jan. 15, 1918.

Application filed June 14, 1917. Serial No. 174,720.

*To all whom it may concern:*

Be it known that I, JOHN E. HUBBELL, a citizen of the United States of America, residing in the city and county of Philadelphia, in the State of Pennsylvania, have invented certain new and useful Improvements in Coke-Ovens, of which the following is a true and exact description, reference being had to the accompanying drawings, which form a part thereof.

My present invention comprises improvements in regenerative coke ovens of the type in which the regenerators are located beneath, and are parallel in length to horizontally elongated coking chambers and interposed heating walls, and each of the latter is formed with a group of vertical flues individually connected to a corresponding one of the regenerators at regular intervals along the upper edge of the regenerator.

The general object of the invention is to provide for an improved distribution of flow of the fluid passing through each regenerator and the group of heating flues directly connected thereto.

In carrying out my invention I provide means for supplying the air or other fluid to be preheated in a regenerator to the latter in such distributed amounts along the edge of the regenerator remote from that to which the flues are connected and with such admission velocities that the flow through the checker brick of the regenerator is of substantially uniform density, and is wholly or mainly transverse to the length of the regenerator.

The various features of novelty which characterize my invention are pointed out with particularity in the claims annexed hereto and forming a part of this specification. For a better understanding of the invention, and the advantages possessed by it, however, reference should be had to the accompanying drawings and descriptive matter in which I have illustrated and described a preferred embodiment of my invention.

Of the drawings:

Figure 1 is a partial sectional elevation, the section being taken on the line 1—1 of Fig. 3.

Fig. 2 is a diagrammatic plan of the coke oven battery shown in part in Figs. 1 and 3.

Fig. 3 is a transverse section through the battery structure, the left hand portion of the figure being in section on the line A—A of Fig. 1, and the right hand portion in section on the line B—B of Fig. 1.

Fig. 4 is a section on the line 4—4 of Fig. 5.

Fig. 5 is a section on the line 5—5 of Fig. 4.

In the particular embodiment of my invention illustrated in the drawings, A represents the coke oven structure proper, A' the series of horizontal coking chambers formed therein, and $A^2$ the heating walls separating the coking chambers. Each heating wall is formed with a plurality of vertical heating flues B, all of which open at their upper ends into a horizontal passage C. Beneath the coking chamber is located a corresponding pair of regenerator chambers D and D', which are placed end to end and are separated adjacent the center of the battery by a division wall $A^3$. Each regenerator is connected by ports B', located at regular intervals along its upper edge, to correspondingly located flues B in one of the heating walls $A^2$. The flues B, forming the group in each heating wall $A^2$ at one side of the central division wall $A^4$, are thus connected to a single regenerator chamber D, while the group of flues at the other side of the division wall $A^4$ in the same heating wall is connected to the alined regenerator D'.

In the particular embodiment of my invention illustrated, the regenerators are employed to preheat air only. The preheated air mingles with, and burns combustible gas supplied to the lower ends of the flues B through gas supply mains I, burner pipes J, and ports $B^2$. Above the checker brick $d$ of each regenerator is an upper horizontal passage $D^2$, and below the checker brick are two lower horizontal passages $D^3$ and $D^4$. The ports connecting the regenerator to the corresponding groups of flues B open into the passage $D^2$, and provisions are made for alternately withdrawing waste gases from, and supplying fluid to be preheated to the bottoms of the regenerators below the checker brick $d$ therein. At the sides of the oven structure are located tunnels E. At any one instant the waste gases leaving the bottoms of the regenerators at one side of the division wall $A^3$ are passed to a chimney M, through one of the tunnels E, while the other tunnel E supplies air to the regenerators at the other side of the division wall $A^3$. The two tunnels E are alternately connected by a reversing valve K to the chimney M. In so far as above described, the coke oven construction illustrated is of a type well known, and in common use, and involves no feature of my present invention.

In accordance with the present invention two connections F and G are provided between each of the regenerators D and D', and the corresponding tunnel E. Each connection F is solely for the flow of waste gases and includes a valve F', which is opened to permit flow from the regenerator to the tunnel E through the corresponding connection F, and is closed to prevent flow through the latter connection when the flow through the corresponding regenerator is reversed. $F^2$ represents a flow regulating damper. As shown, each connection F communicates directly with the outer end of the passage $D^3$ of the corresponding regenerator. Each passage $D^4$ in the construction shown receives an air supply pipe H, which has its outer end placed in communication with the adjacent tunnel E by means of a corresponding connection G. The pipe H is provided at its upper side with restricted discharge ports H' distributed at intervals along its length. An exhaust fan L is shown as interposed between the tunnels E and the chimney M. A blower O supplies air alternately to the two tunnels E according to the setting of the reversing valve K.

By properly proportioning each pipe H and its discharge ports H' relatively to one another and to the pressure differentials governing the flow through the ports, and through the regenerator into which they discharge the fluid to be preheated may be caused to flow through the checker brick $d$ of the regenerator uniformly, and with a direction of flow wholly, or for the most part, transverse to the longitudinal axis of the regenerator. The invention thus avoids the substantial flow through the regenerators in directions parallel to their lengths, which has heretofore been a characteristic of operation of certain coke ovens, and has been relied upon to exert a regenerator pressure and flow equalizing effect tending to make the distribution of flow through the regenerative checker brick and the flues B connected to the regenerator chambers more uniform. The use of the present invention not only makes possible a highly uniform distribution of flow among the various flues B connected to each regenerator but also tends to eliminate undesirable eddy currents, and certain pressure and flow variations in the regenerator experienced when the flow through the latter comprises a substantial longitudinal component.

In the preferred embodiment of my invention illustrated in the drawings the waste gas outlet channel $D^3$ and the air supply conduit H of each regenerator are alike in that each runs along substantially the whole bottom edge of the regenerator and communicates with the preheating space formed by the checker brick interstices at intervals along its entire length. The likeness between the two conduits may sometimes be enhanced in practice, with advantage, by spacing the row of checker brick immediately above the conduit $D^3$, as shown in Fig. 3, so as to restrict, or by otherwise restricting, communication between the conduit $D^3$ and the regenerator proper, without destroying the longitudinally distributed character of this communication. While the waste gas and supply conduits of each regenerator are thus similar it is in practice impossible to use a single conduit for both air and waste gases and obtain the advantages of the present invention. From a practical standpoint the air supply ports H' must so be restricted in size to give the proper air distribution that they would not pass the waste gases with the pressure differentials available when the flow through the regenerator is reversed. Furthermore, in order to obtain a uniform distribution of discharge along the length of each pipe H the ports H' should in general increase in area from the outer end of the pipe H to its inner end in order to compensate for the corresponding increase in static pressure within the pipe H; while, if communication between the outlet passage $D^3$ and the regenerator proper is formed by means of a series of restricted ports, these should ordinarily increase in cross section from the center of the battery outward.

In lieu of the separate restricted parts H' each pipe H may be formed, as shown in Figs. 4 and 5, with a narrow discharge slit $H^{10}$, extending along the whole length of the portion of the pipe H inserted in the regenerator.

While in accordance with the provisions of the statute I have illustrated and described the best form of my invention now known to me, it will be obvious to those skilled in the art that changes may be made in the form of the apparatus disclosed without departure from the spirit of the invention set forth in the appended claims.

Having now described my invention, what I claim as new and desire to secure by Letters Patent, is:

1. A regenerative coke oven of the type comprising a series of heating walls, each formed with a plurality of heating flues, and regenerators parallel to said heating walls, and each connected at intervals along one side to various flues of a corresponding heating wall, and provided at its opposite side with an outlet passage for waste gases, and in combination therewith, separate means for supplying fluid to be preheated to each of said regenerators with substantial uniformity along its opposite side.

2. A regenerative coke oven of the type comprising a series of heating walls, each formed with a plurality of heating flues, and regenerators parallel to said heating walls, and each connected at intervals along one side to various flues of a corresponding heating wall, and provided at its opposite side with an outlet passage for waste gases, and in combination therewith, separate means for introducing fluid to be preheated into each of said regenerators at distributed points along its said opposite side.

3. In a regenerative coke oven comprising a series of heating walls, each formed with a plurality of heating flues, the combination therewith of regenerators parallel to said heating walls, and each connected at intervals along one side to flues of a corresponding heating wall, and provided at its opposite side with an outlet passage for waste gases, and with a separate supply conduit for fluid to be preheated having a discharge port area into said regenerator distributed longitudinally along said opposite side of said regenerator.

4. In a regenerative coke oven comprising a series of heating walls, each formed with a plurality of heating flues, the combination of regenerators parallel to said heating walls, and each connected at intervals along one side to flues of a corresponding heating wall and provided at its opposite side with two passages each having communication with the regenerator longitudinally distributed along the length of said opposite side, means for supplying fluid to be preheated to one, and means for withdrawing waste gases from the other of the said two passages of each regenerator.

5. In a regenerative coke oven comprising a series of heating walls each formed with a plurality of heating flues, the combination therewith of regenerators, parallel to said heating walls, and each connected at intervals along its upper edge to flues of a corresponding heating wall, and provided at its opposite side with an outlet passage for waste gases and with a separate supply conduit for fluid to be preheated, a main conduit to which the said outlet passage and the said supply conduit of a plurality of said regenerators are connected, and means for alternately supplying fluid to be preheated to, and withdrawing waste gases from said main conduit.

JOHN E. HUBBELL.